United States Patent Office 3,605,723
Patented Sept. 20, 1971

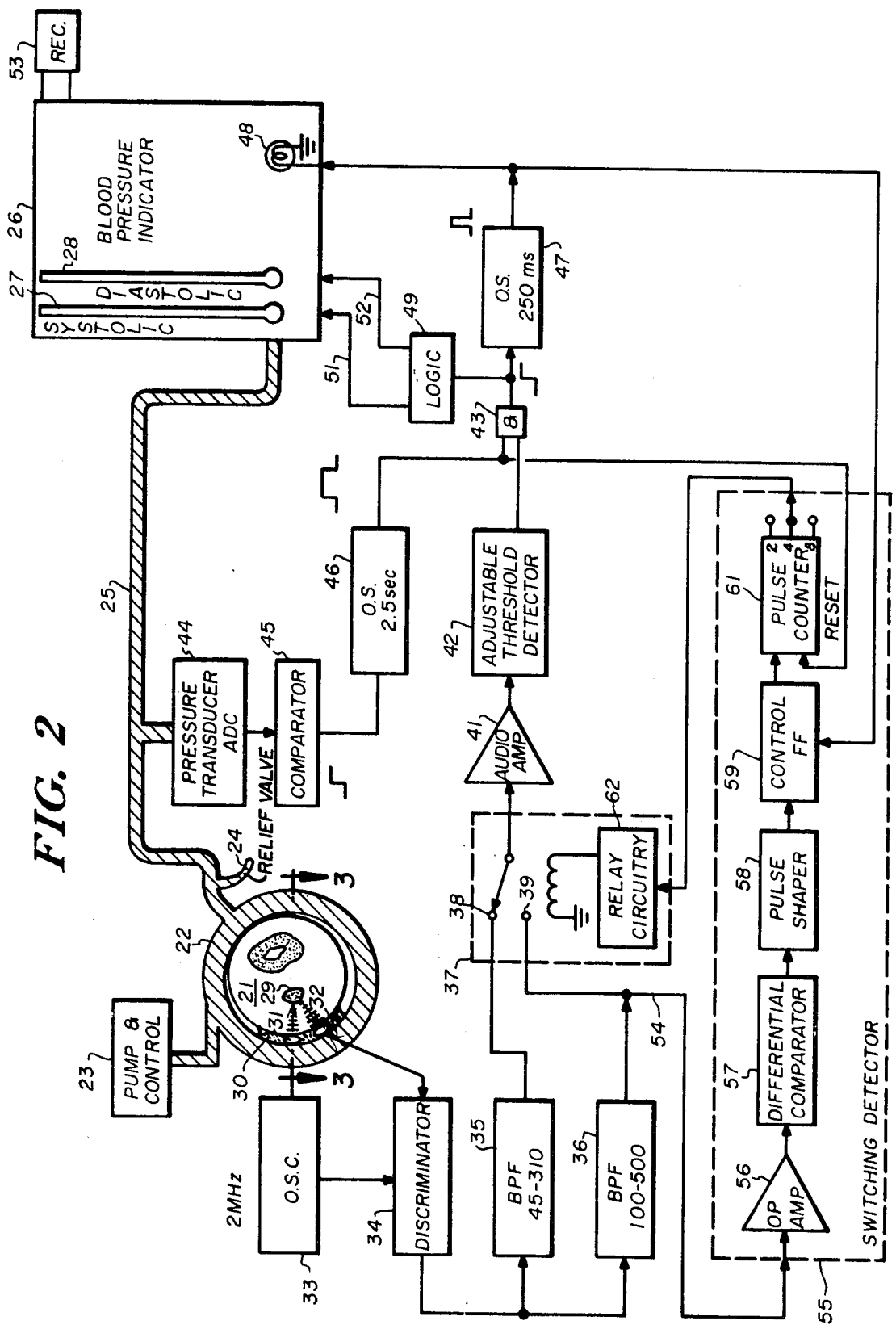

3,605,723
BLOOD PRESSURE MONITOR
Eugene King, Yardley, Pa., and Harold Lee Massie, Trenton, N.J., assignors to Hoffmann-La Roche Inc., Nutley, N.J.
Filed Sept. 3, 1969, Ser. No. 854,847
Int. Cl. A61b 5/02
U.S. Cl. 128—2.05M
15 Claims

ABSTRACT OF THE DISCLOSURE

Apparatus for automatically implementing indirect arterial blood pressure measurement with a transmitter-receiver operation for deriving Doppler shifted information due to arterial wall movement under external pressure, by observing and selectively monitoring electrical Doppler signals representative of the information through a filter arrangement operating in a first and second band pass frequency range, where the second band pass frequency range is employed instead of the first on the basis of certain criterion observed in monitoring the arterial movement.

BACKGROUND OF THE INVENTION

(1) Field of the invention

This invention relates broadly to indirect blood pressure measurement, and, more particularly, to a method and apparatus for automatically implementing an indirect blood pressure measurement technique based on evaluation of arterial wall movements.

(2) Description of the prior art

The standard clinical technique for indirect blood pressure measurement is the estimation of intra-arterial pressure by "Korotkoff" sounds. This includes placement of the familiar pressure cuff about body limb, such as an arm, containing the artery in question. The functioning of this technique, commonly referred to as the Korotkoff method, calls for initially inflating the presure cuff to a level exceeding the peak intra-arterial blood pressure so as to cut off blood flow, and then slowly deflating the cuff to diminish the pressure while listening to the presence and/or absence of downstream audible sounds which are understood, from numerous articles, to result from blood turbulence flowing from the constricted segment of the artery when cuff pressure decreases below peak intra-arterial pressure over a series of successive cardiac cycles. These audible sounds are normally detected by use of a stethoscope or microphone. By simultaneously observed cuff pressure and listening to the audible sounds, the operator may estimate systolic and diastolic blood pressure values of a particular patient.

In searching for an indirect blood pressure measurement approach for providing more precise measurements and which were relatively free from artifact due to ambient noise, recent techniques were developed which are basically directed to detecting wall motion of the arterial segment constrictable under occlusive pressure during the phase of rapid transition of the wall between open and closed configurations. Systolic blood pressure can be observed from the cuff pressure at the moment that the occluded artery first begins to change its shape from closed to open configurations momentarily, and diastolic pressure can be observed from the cuff pressure at the moment that the artery ceases to be occluded during any part of the cardiac cycle.

A vehicle used for determining such changes in arterial wall position is the continous wave Doppler ultrasound technique. The Doppler ultrasound technique allows information from stationary objects to be ignored, signals being obtained from moving structures only. The Doppler shift signal is at an audio frequency which is proportional to the instantaneous velocity of the reflecting target's motion with respect to the transmitting ultrasonic transducer. Additional discrimination in favor of signals from the desired targets and against unwanted signals may be obtained by virtue of the highly directional characteristics of ultrasound.

In utilizing this new technique for indirectly measuring blood pressure, opening and closing artery events could be precisely defined with respect to time by use of a harmless beam of energy aimed at the arterial segment in question. The present method does not depend on blood flow as conventional methods and thus is completely free from the well known auscultatory gap artifact associated with the auscultatory method; however, problems have been encountered with the varying velocity of and distance moved by the arterial wall under pressure, from subject to subject, and run to run, as well as low frequency modulation radio frequency noise carried back to the receiver. Some of these problems result from varying size artery diameters and wall thicknesses, and Doppler signals being received from other than the arterial segment area being occluded. In analyzing one problem it is evident that with an artery having a large reflecting surface Doppler signals having significant amplitudes or energy levels could be generated during pulsations below diastole at low audio frequencies. The signal amplitude will also vary as between a thin arm and one having excessive tissue causing attenuation of the ultrasonic energy. The health state of the patient is also, in part, an influence, as obviously in a shock case (low pressure) arterial wall velocities will be slower than those in high blood pressure cases.

OBJECTS AND SUMMARY OF THE INVENTION

It is, therefore, an object of the invention to provide an improved indirect blood pressure measurement system of the type described for detecting arterial wall movements by, under certain prescribed conditions, automatically varying criterion for detecting such movements.

In accordance with the invention, a detecting ciricuit is used to monitor signals representative of arterial wall motion with a first filter having a frequency range other than the frequency range of a second filter initially used for evaluating these signals during systole, whereupon when the detecting circuit will respond to signals of at least a pre-established energy level passed by the first filter, the first filter is automatically selected to pass and evaluate the signals at post systole. Recurrence of such signals passed by the first filter above the pre-established energy level is also a factor to be employed in ascertaining the automatic selection.

It is a further object of the present invention to provide an improved indirect blood pressure measurement system of the type described for detecting arterial wall movements to ascertain systolic and diastolic pressure values of a subject, by selectively utilizing a filter for attenuating in a prescribed frequency range Doppler signals indicative of arterial wall motion to suppress undesirable signals including noise.

BRIEF DESCRIPTION OF THE DRAWINGS

FIG. 2 is a schematic representation of the preferred embodiment of the present invention utilizing the ultrasonic Doppler technique for monitoring blood pressure values.

GENERAL

Figure 1:
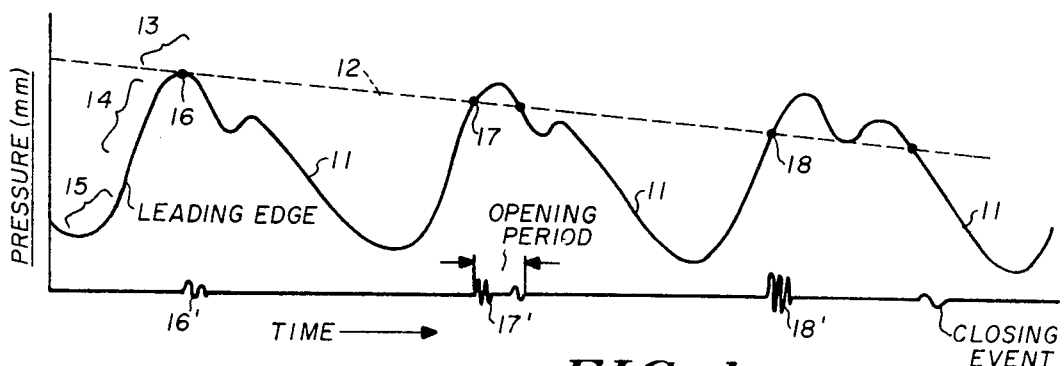
FIG. 1 is a graphic representation of blood pressure plotted versus time with an indication of occlusive pressures.

The behavior of the arterial wall under cuff pressure might be best described with reference to FIG. 1 wherein there is shown a series of successive arterial pressure waves 11 and a dashed line 12 representation of cuff pressure as it is decreased within an inflated cuff about a subject's arm. As may be readily observed the slope of the leading edge at each cardiac cycle of an arterial pressure waveform is gradual at the top 13, abrupt at the middle 14 and a little less abrupt about the base 15.

As the cuff occluding pressure approximates systolic pressure the arterial wall will open and close at a slow velocity as represented by Doppler signal 16' due to the acute angle intersection of the decreased cuff pressure as it crosses the intra-arterial pressure wave representation. A further decrease of cuff pressure will intersect the successive arterial pressure wave at point 17 at a less acute angle and its effect on the artery will cause an opening event depicted by Doppler signal 17' at a much higher velocity. In the same manner, intersection of a successive arterial pressure wave along its steep slope at point 18 will cause a very abrupt opening of the artery as indicated by the high velocity opening event depicted by Doppler signal 18'.

It may be seen then, in many instances with the normal case lower velocity Doppler signals will be observed at systole and higher velocity Doppler signals observed after systole. In shock cases, however, where low blood pressure is present this may not necessarily be the case. After careful investigation of these observations coupled with investigation of the problems heretofore noted, the present invention, providing for a more accurate measurement of blood pressure values, including diastole, was developed as will be described hereinafter.

DESCRIPTION OF THE PREFERRED EMBODIMENT

Figure 3:
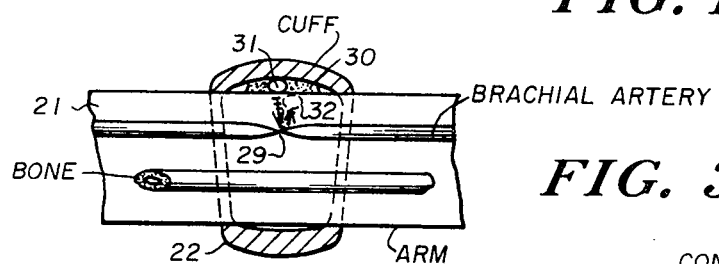
FIG. 3 is a cross section of an arm taken along the line 3–3' in FIG. 1 to illustrate how an artery wall in a body is investigated for detecting arterial wall movement.

With reference to the drawings there is shown in FIGS. 2 and 3 a representation of an upper arm 21 of a subject encircled by the conventional pneumatic cuff 22 inflatable by a suitable pump and control unit 23. A typical pneumatic system employed for occluding the brachial artery might include a conventional automated electro-pneumatic system (not shown) to rapidly inflate and then gradually deflate the cuff such as by a relief valve 24, allowing air from the cuff to be bled off at a uniform rate subsequent to attaining a sufficiently high predetermined cuff pressure. Tubing 25 connects the cuff with an indicator unit 26 including a pair of manometers 27, 28 for respectively displaying a patient's systolic and diastolic blood pressure values.

Placed underneath the cuff and in contact with the arm is an ultrasonic transducer assembly 30 used in detecting arterial wall movements about artery segment 29 to be occluded. The particular transducer assembly illustrated comprises a pair of piezoelectric crystals 31, 32, one crystal 31 used with a radio frequency oscillator 33 for radiating a beam of 2 mHz. ultrasonic energy toward the artery segment 29 environed by the cuff, and the second crystal 32 employed for receiving the ultrasonic energy reflected from arterial segment 29 and converting the received energy into an electrical signal. Separate transmitting and receiving crystal elements are depicted in describing the invention, however, it should be understood that a common receiving and transmitting element may be readily employed.

The receiver crystal in the present embodiment is coupled to a discriminator 34 for detecting the resulting low deviation frequency and phase modulated signals associated with the Doppler shift produced by the artery wall movement. The discriminator is then connected to each of the two band pass filters 35, 36 which may be of the passive or active type. When using a 2 mHz. oscillating frequency, with reference to FIG. 6 it is shown that filter 35 is adapted to pass low frequency audio signals. The filter 35 has a bandwidth of about 45 Hz. to approximately 300 or at −3 db with a reference point of 0 db at 100 to 200 cycles. The filter has an attenuation of 18 db to 30 db per octave at the lower side and a minimum of 12 db per octave attenuation at the high side. Filter 36 is adapted to pass signals having frequency content at a −3 db point of 100 Hz. to 500 Hz. with a minimum attenuation of 18 db to 30 db per octave at the low side. The output lead of filter 35 is connected to the initially closed contact 38 of a relay switch 37, whereas the filter 36 output lead is connected to the open contact 39.

Connected from the output side of relay switch 37 is an audio amplifier 41 coupled to an adjustable threshold detector 42. The digital output of threshold detector 42 is connected with one input of an AND gate 43.

Connected at a point along tubing 25 is a pressure transducer 44 for sensing and converting the existing pressure in the cuff to an analogous electrical signal. The pressure transducer is coupled to a differential comparator 45 for detecting at what point the cuff has been inflated to a maximum pre-determined pressure prior to deflating the cuff. A one shot multivibrator 46 is connected from comparator 45 to a second input of AND gate 43. When triggered by the leading edge from comparator 45, one shot multivibrator 46 will generate a signal having a pulse width of e.g. two and a half seconds. In addition to another function to be later described, the 2.5 second one shot pulse is employed as an inhibition pulse to AND gate 43 to prevent false triggering by either the pump motor or the cuff adjusting to the air pressure. The output of AND gate 43 is connected to a one shot multivibrator 47 and thence to indicator unit 26. When triggered, one shot multivibrator 47 generates a 250 ms. pulse energizing lamp 48 to give a momentary visual indication whenever a Doppler signal resulting from arterial wall motion is present. The output of AND gate 43 is also connected through logic circuitry 49 for controlling the systolic and diastolic manometers 27, 28 through leads 51 and 52 respectively, to set the pressure level of the manometers at the measured systolic and diastolic pressure points of the subject. If desired, a recorder 53 may be connected to indicator 26 to provide a record of digital and/or analog information representative of blood pressure.

With reference back to the output of filter unit 36, a branch lead 54 is connected to a switching detector circuit generally designated within the dashed lines as 55, utilized for monitoring signals passed by the 100 cycle band pass filter and responding to certain events for actuating relay switch 37.

The input lead to switching detector 55 is coupled to an operational amplifier 56 the output of which goes to a differential amplifier 57 serving as a threshold comparator for a certain level reference potential. Connected from differential amplifier 57 is a pulse shaper 58 which is coupled to a control flip flop 59 which in turn is further connected from one-shot 47 to reset flip flop 59 at the trailing edge of the 250 ms. artery light pulse. A pulse counter 61 is connected from control flip flop 59 and also from the one-shot unit 46 for reset purposes. The output of pulse counter 61 is connected to relay circuitry of relay switch 37 for energizing the relay switch.

Figure 4:
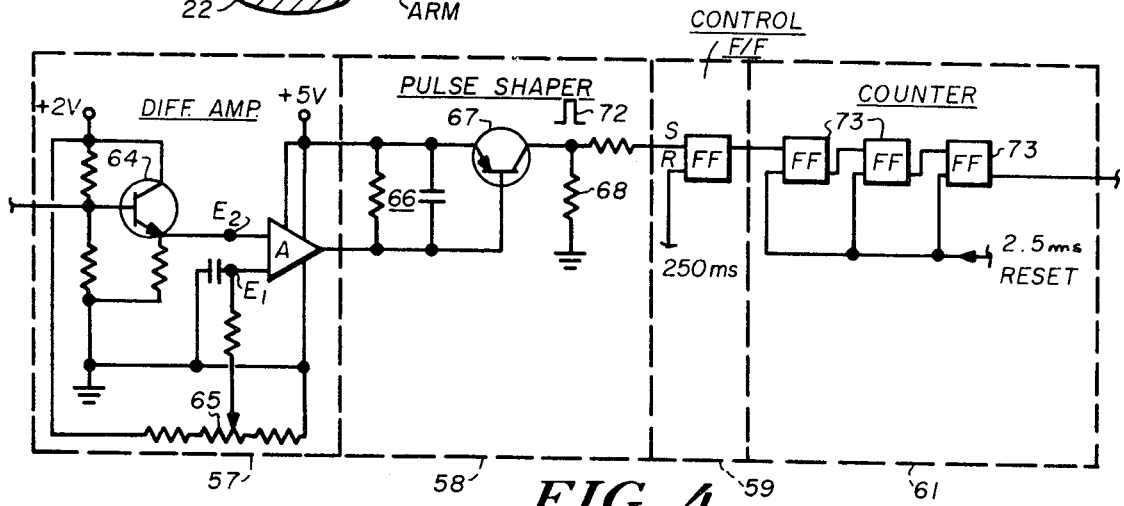
FIG. 4 is a more detailed schematic representation of the switching detector 55 of FIG. 2.
Figure 5:
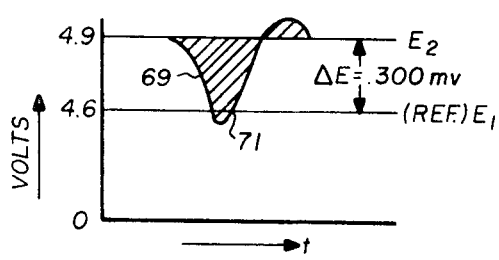
FIG. 5 is a graphic representation of the input potentials $E_1$ and $E_2$ versus time at differential comparator 57 of FIG. 4.

Illustrated by FIG. 4 is a detailed circuit diagram of units 57, 58, 59 and 61 of switching detector 55 wherein a signal from operational amplifier 56 will be coupled to a transistor 64 serving as an emitter follower to present a stable DC emitter level $E_2$ of approximately 4–5 volts at one input to the comparator with artery AC signals of approximately 100 mv. peak to peak and higher riding on it. The second input to the differential comparator is a DC threshold level $E_1$ adjustable between approximately 1 to 5 volts through a potentiometer 65. The threshold setting of $\Delta E = E_2 - E_1$ determines the artery signal amplitude criterion for actuating the comparator to drive the pulse shaper, including integrating unit 66, and turn on transistor 67 presenting a logic high level at one input to the control flip flop 59. When transistor 67 is off its output level is low through resistor 68 to ground. For example, with reference to FIG. 5, assuming the differential voltage $\Delta E$ is set to .300 mv., then as an artery pulse 69 exceeds the differential voltage at 71, an artery digital signal 72 is generated at the collector of transistor 67 to set control flip flop 59.

Counter 61 includes three flip flop units for recording successive pulse signals generated by control flip flop 59. When four of the patient's artery (audio) signals have a 100 Hz. content of sufficient magnitude, the output of the last counter flip flop 73 will go low to trigger the relay circuitry 62 including the conventional relay latch and driver.

OPERATION

Referring now to FIGS. 1 and 2, a predetermined pressure is first built up in the cuff to exceed the subject's systolic pressure so as to occlude and thus express blood from that segment 29 of the artery under the cuff. Then, as cuff pressure is decreased through relief valve 24, blood will momentarily fill artery segment 29 during systole when cuff pressure equals or is slightly less than systolic intra-arterial pressure. As cuff pressure continues to decrease, the artery segment 29 remains open for longer intervals of time as is graphically represented in FIG. 1, and finally remains open continuously when cuff pressure equals diastolic pressure.

During the above operation, a 2 mHz. RF ultrasonic signal is directed to the arm by transmitting crystal 31. The reflected ultrasonic energy from moving surfaces within the arm including the Doppler shifted artery signals are received by crystal 32, converted into electrical signals and applied to discriminator 34 where the deviation of the 2 mHz. carrier develops difference frequencies or Doppler signals indicative of the rate of modulation of the 2 mHz. carrier by the artery wall movement. In general, consideration as to the particular band of frequencies utilized in filters 35, 36, was established after careful investigation of artery wall velocities resulting from cuff pressure, and the rate of modulation of a 2 mHz. carrier by the wall movement.

In analyzing the Doppler signal developed by demodulation, it has been found that each amount of energy reflected by the artery wall, the excursion length of the artery wall, and the rate of deviation velocity of the arterial wall are to be considered. In most instances, given the same conditions, these three independent variables vary from person to person and from run to run. In a normal blood pressure measurement the characteristics of the Doppler signals detected, as a result of these independent variables, are distinguishable as to amplitude and frequency so that, with proper signal processing systolic and diastolic values may be more precisely ascertained to evaluate true blood pressure values. Accordingly, the present invention has been developed for first monitoring systole, and then when certain distinguishable criterion are detected in a subject's Doppler signals, automatically switching or varying the initial monitoring arrangement for more accurately ascertaining subsequent blood pressure values including the diastolic blood pressure of the subject.

Figure 6:
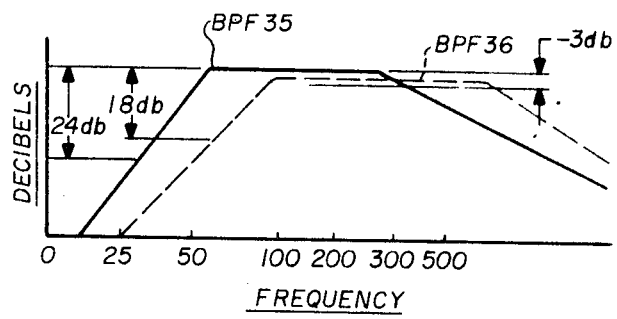
FIG. 6 is a graphic representation of decibels versus frequency to illustrate these characteristics of band pass filters 35, 36 in FIG. 2.

As may be observed with reference to FIG. 6, filter 35 will pass, with virtually no attenuation, any Doppler signals having an audio frequency content of 45 Hz. and higher to about 310 Hz. Because of the attenuating or stop band slope at the low side, signals having audio frequencies below 45 Hz. will be attenuated at a preferred rate of approximately 24 db per octave to, in effect, virtually suppress signals having low frequency content in the 0–20 cycle range and also suppress signals between the 20–45 cycle range where the amplitude of the incoming signals is not significant. Below 45 Hz. this filter serves to suppress extraneous arm motion, arterial wall motion not induced by cuff pressure, line transients, radiation, etc.

The output of filter 35 is applied via contact 38 of relay switch 37 to audio amplifier 41 for amplification, and then at threshold detector 42 the Doppler signals are amplitude discriminated from noise signals such as those including extraneous arm motion, arterial wall motion not induced by cuff pressure, line transients, radiation, etc. Signals passed by the threshold detector 42 are then applied to AND gate 43.

In referring back to the pressure build-up in cuff 22, the pressure at connection tube 25 is converted to a digital signal by pressure transducer unit 44, and compared with a set value to ascertain when a predetermined maximum pressure is built up in the cuff. At this point operation of pump 23 is stopped and the cuff is gradually deflated via relief valve 24, and a signal is generated by comparator 45 which triggers one shot unit 46 to produce an output pulse of 2.5 seconds duration disabling AND gate 43. This prevents false triggering by signals emanating from either the pump motor or the cuff adjusting to air pressure, by inhibiting such false triggered signals from entering logic circuitry 49.

Subsequent to the 2.5 second inhibiting pulse duration, upon a signal being passed by threshold detector 42 AND gate 43 will be enabled to trigger one shot unit 47 producing an output pulse of 250 ms. to energize artery light 48. Output pulses from AND gate 43 will also effect logic 49 to cause the systolic and/or diastolic manometers 27, 28 to provide indications of the subject's blood pressure.

With reference back to discriminator 34, Doppler signals are simultaneously fed to band pass filter 36, which in the present embodiment as illustrated in FIG. 6, will pass any Doppler signals having audio frequency content of 100 Hz. and higher to about 500 Hz. The stop band below 100 Hz. having an attenuation characteristic of about 21 db per octave will, in effect, pass signals having audio frequency content of lower than 100 Hz. which despite attenuation still have a meaningful intensity. Sufficient poles or decibels per octave are necessary to separate out the small shifts in Doppler frequencies at diastole. The Doppler signals which are passed by filter 36 are monitored by a switching detector 55, which is responsive to certain predetermined criterion to energize relay switch 37 causing contact 39 to be closed whereby filter 36 is thereafter used for passing Doppler signals for blood pressure measuring purposes.

An input Doppler signal passed by BPF 36 to switching detector 55 will be compared with a reference in differential comparator 57 and again passed if it exceeds the reference voltage. Pulse shaper 58 will convert the comparator output to a digital output to set control flip flop 59 if coincident with the 250 ms. artery pulse to, in effect, act as an AND gate at the input of the control flip flop, and where the flip flop is reset at the trailing edge of the 250 ms. artery light pulse from one shot unit 47. The 250 ms. pulse duration ensures that only one count per heart beat will enable the control flip flop and enter counter 61, making the switching detector independent from heart rate and number of pulses per heart beat to ignore other non-relevant pulses during a single heart beat, as this 250 ms. period is about the minimum interval between heart beats in an adult human, whether in a distressed or normal healthy state.

As illustrated in FIG. 2, the counter 61 output may be arbitrarily selected to count for example 2, 4 or 8 Doppler signals, however, in this embodiment, upon four Doppler signals being passed by filter 36 and differential comparator 57 to reset control flip flop four times, the output of counter 61 will be enabled to activate relay circuitry 62 cause the relay switch to be energized and switch the relay contacts from 38 to 39, thereby causing the BPF 36 to be connected with audio amplifier 41, in lieu of BPF 35, for blood pressure monitoring. The counting of four of such Doppler signals has been selected as a probability of four artifact signals having been counted is virtually non-existent. Once the relay switch has been set, it and counter 61 are not set again until the leading edge of the 2.5 sec. pulse from one shot unit 46 is generated indicating recycling of the device by activation of the maximum cuff pressure comparator 45. Of course, it is understood that the filters may not necessarily be switched during each device cycle, as with any one particular subject four Doppler signals of sufficient energy may not be passed by BPF 36.

It should be understood, of course, that the foregoing disclosure related to only a preferred embodiment of the invention and that numerous modifications or alterations may be made therein without departing from the spirit and scope of the invention. For example, if the oscillating or transmitting frequency used was 8 Hz. instead of 2 mHz. BPF 35 would be set from about 180 to 1240 Hz. and BPF 36 would be set from about 400 to 2000 Hz. Obviously this occurs as since the transmitting frequency is increased fourfold over 2 mHz., the number of wavelengths intersecting the artery wall movement or being modulated by the wall movement would also increase by a factor of four.

We claim:

1. In an indirect arterial blood pressure measuring apparatus for monitoring Doppler shifted information due to arterial wall movement under external pressure causing the snapping open or closing of the artery wall comprising, transmitter and receiver means for deriving said Doppler shifted information and generating electrical Doppler signals having frequency content representative of said arterial wall movement, filter means connected from said transmitter and receiver means to pass a first band of frequencies and selectively actuable to pass a second band of frequencies in lieu of the first band, detector means responsive to the intensity of signals from said filter means in said second band of frequencies to actuate the filter means to pass said second band of frequencies.

2. Apparatus according to claim 1 where,
said detector means includes comparator means for passing signals having an intensity above a preselected level.

3. Apparatus according to claim 2 where,
said detector means further includes resettable counter means to count the signals passed by said comparator means.

4. Apparatus according to claim 3 where,
said filter means includes switch means normally connected to pass said first band of frequencies, and
said switch means is responsive to a predetermined count at said counter means, to be actuated to pass said second band of frequencies in lieu of the first band.

5. Apparatus according to claim 1 where said transmitter and receiver means includes,
transducer means including a signal generator for transmitting ultrasonic energy to and receiving reflected ultrasonic energy from said artery wall, and
means for demodulating the reflected energy to provide said electrical Doppler signals.

6. Apparatus according to claim 3 including,
inhibiting means connected between said counter means and comparator means, to permit only one count per subject heart beat to enter the counter means.

7. Apparatus according to claim 3 including,
means for resetting said counter means with each operation of said apparatus.

8. Apparatus according to claim 5 where,
said transducer means is operated at a transmitting frequency of 2 mHz., and
said first band of frequencies has a low side cut off of about 45 Hz. with an attenuation slope of about 18 to 30 db per octave and said second band of frequencies has a low side cut off of about 100 Hz. and an attenuation slope of about 18 to 30 db per octave.

9. Apparatus according to claim 4 where,
said switch means is actuated by a count of at least two from said counter means.

10. An indirect arterial blood pressure measuring apparatus comprising, external pressure means for externally occluding an arterial section and inducing opening and closing events of the artery in response to coaction of arterial pressure with occluding pressure, transceiver means including transducer means for transmitting ultrasonic energy to and receiving energy from said section and generating electrical Doppler signals having frequency content representative of the arterial section wall movement, first filter means connected from said transceiver means for passing in a first band of frequencies signals representative of slow arterial wall movements, and second filter means connected from said transceiver means for passing in a second band of frequencies signals representative of relatively faster arterial wall movement, indicating means calibrating said external pressure means and responsive to said Doppler signals for displaying blood pressure values, switch means for normally connecting said first filter means with said indicating means and selectively actuable to connect said second filter means in lieu of said first filter means with said indicating means, and detector means for monitoring Doppler signals from said second filter means and responsive to pre-selected events to activate said switch means.

11. Apparatus according to claim 10 where said detector means includes,
comparator means for passing Doppler signals having an intensity above a preselected threshold value.

12. Apparatus according to claim 11 wherein said detector means further includes,
resettable counter means to count the signals passed by said comparator means whereby said switch means is responsive to and activated at a predetermined count at said counter means.

13. Apparatus according to claim 12 wherein said detector means further includes,
inhibiting means connected between said comparator and counter means, to permit only one count per subject heart beat to enter the counter means.

14. Apparatus according to claim 12 including
pressure level means responsive to a maximum predetermined cuff pressure for providing an output pulse whereby said counter means is reset by said output pulse.

15. Apparatus according to claim 10 where,
said transceiver means is operated at a transmitting frequency of 2 mHz., and
said first filter means has a low side cut off of about 45 Hz. with an attenuation slope of about 18–30 db per octave and said second filter means has a low side cut off of about 100 Hz. and an attention slope of about 18–30 db per octave.

References Cited

UNITED STATES PATENTS

| | | | |
|---|---|---|---|
| 3,308,811 | 3/1967 | Gillette et al. | 128—2.05M |
| 3,453,871 | 7/1969 | Krautkramer | 73—67.8 |
| 3,527,197 | 9/1970 | Ware | 128—2.05A |
| 3,532,085 | 10/1970 | Massie | 128—2.05M |

WILLIAM E. KAMM, Primary Examiner

U.S. Cl. X.R.

73—398R